(12) United States Patent
Konno

(10) Patent No.: US 7,724,337 B2
(45) Date of Patent: May 25, 2010

(54) IN-PLANE SWITCHING LCD APPARATUS HAVING PARALLEL UNIFORM PIXEL AND COMMON ELECTRODE EXTENSIONS HAVING A PRINCIPAL PORTION AND A SPECIFIC PORTION

(75) Inventor: Takayuki Konno, Kanagawa (JP)

(73) Assignee: NEC LCD Technologies, Ltd., Kawasaki, Kanagawa (JP)

( * ) Notice: Subject to any disclaimer, the term of this patent is extended or adjusted under 35 U.S.C. 154(b) by 498 days.

(21) Appl. No.: 11/717,164

(22) Filed: Mar. 13, 2007

(65) Prior Publication Data

US 2007/0216841 A1    Sep. 20, 2007

(30) Foreign Application Priority Data

Mar. 14, 2006    (JP)    ............... 2006-068657

(51) Int. Cl.
   *G02F 1/1343*    (2006.01)
(52) U.S. Cl. ...................................... 349/141
(58) Field of Classification Search ................. 349/141
   See application file for complete search history.

(56) References Cited

U.S. PATENT DOCUMENTS

| | | | |
|---|---|---|---|
| 6,657,694 B2 * | 12/2003 | Ko et al. ...................... | 349/141 |
| 6,710,836 B2 * | 3/2004 | Lee .............................. | 349/141 |
| 6,798,484 B2 * | 9/2004 | Yang et al. ................... | 349/141 |
| 6,839,113 B2 * | 1/2005 | Watanabe et al. ............ | 349/141 |
| 2006/0001815 A1 | 1/2006 | Kim et al. | |

FOREIGN PATENT DOCUMENTS

| | | |
|---|---|---|
| JP | 2000-098405 | 4/2000 |
| JP | 3120751 | 10/2000 |
| JP | 3132483 | 11/2000 |
| WO | WO99/45430 | 9/1999 |

OTHER PUBLICATIONS

Chinese Office Action dated May 22, 2009.
Chinese Office Action dated Dec. 18, 2009 with an English Translation.

* cited by examiner

*Primary Examiner*—John Heyman
(74) *Attorney, Agent, or Firm*—McGinn IP Law Group, PLLC

(57) ABSTRACT

A pixel region between a common electrode and a pixel electrode is composed of a principal portion in which the direction of extension of the common electrode and the pixel electrode is parallel with the initial alignment direction of the liquid crystal molecules, and a specific portion not parallel with the initial alignment direction of the liquid crystal molecules. In the specific portion, the distal portion of the pixel electrode and the basal portion of the common electrode are mutually parallel and inclined by a prescribed angle with respect to the initial alignment direction of the liquid crystal molecules. When voltage is applied across the common electrode and the pixel electrode to generate a horizontal electric field, the horizontal electric field will be perpendicular to the initial alignment direction of the liquid crystal molecules within the principal portion that occupies a major part of a column, whereas the field will not be perpendicular within the specific portion. The principal portion occupies the major part of the column.

20 Claims, 13 Drawing Sheets

IN-PLANE SWITCHING LCD APPARATUS HAVING PARALLEL UNIFORM PIXEL AND COMMON ELECTRODE EXTENSIONS HAVING A PRINCIPAL PORTION AND A SPECIFIC PORTION

BACKGROUND OF THE INVENTION

1. Field of the Invention

The present invention relates to an in-plane switching liquid crystal display apparatus, and relates in particular to an in-plane switching liquid crystal display apparatus operating on an active matrix principle.

2. Description of the Related Art

The in-plane switching (IPS) format has come to enjoy widespread use in big screen monitors such as TVs. In the IPS format, display takes place through rotation of the liquid crystals about the molecular axes within a plane parallel to the substrate under the action of a horizontal electric field generated parallel to the substrate. With this format, the viewing angle is not dependent on the rise angle of the molecular axes, and viewing angle characteristics are therefore markedly improved over those of twisted nematic (TN) format.

While the IPS format offers advantages in terms of viewing angle characteristics, a pretwist angle must be provided in order for the direction of rotation of the liquid crystal molecules to be made uniform. Specifically, the initial alignment axes of the liquid crystal molecules must be inclined with respect to the direction of application of the horizontal electric field.

FIG. 1 is a schematic plan view illustrating the need for a pretwist angle in a conventional liquid crystal display apparatus. As shown in FIG. 1, in a liquid crystal display apparatus of the prior art, a comb-shaped common electrode 91 and pixel electrode 92 are formed on each pixel, and voltage is applied across the common electrode 91 and the pixel electrode 92 in order to generate a horizontal electric field 96 perpendicular to the direction of extension of the electrodes. The initial alignment direction 97 of the liquid crystal molecules is parallel to the direction of extension of the electrodes. When the pretwist angle of the liquid crystal molecule axes is inclined with respect to the direction perpendicular to the direction of the horizontal electric field, the initial alignment direction 97 of the liquid crystal molecules will be perpendicular to the horizontal electric field 96 in cases in which the pretwist angle is equal to 0 degrees, as depicted in FIG. 1, and a direction of rotation of the liquid crystal molecules will not be fixed. As a result, the liquid crystal molecules are able to rotate either left or right, and disclination lines of discontinuous alignment of the liquid crystal molecules occur at the boundaries of domains of mutually opposing rotation directions, causing picture quality to deteriorate.

For this reason, is necessary for the pretwist angle to be set to some value other than 0 degrees in order to make the direction of rotation of the liquid crystal molecules uniform. However, if the pretwist angle is too large, the white luminance will not be high enough for sufficient contrast to be achieved. Under these circumstances, it is typical practice to make the pretwist angle from 10 to 20 degrees.

FIG. 2 is a schematic plan view showing a pixel of a first conventional liquid crystal display apparatus. The drawing depicts the case of a single domain in which the liquid crystal molecules are oriented in a single direction within the pixel. As shown in FIG. 2, the pixel is provided with a comb-shaped common electrode 101 and pixel electrode 102; an electric field 106 is applied in a direction perpendicular to the direction of extension of the common electrode 101 and the pixel electrode 102. In order to give a pretwist angle 108, the direction of initial alignment 107 of the liquid crystal molecules 105 is inclined by the aforementioned angle with respect to the direction of extension of the common electrode 101 and the pixel electrode 102. In cases in which the rubbing technique is used, rubbing will be carried out in a direction inclined by the equivalent of the pretwist angle 108 with respect to the direction of extension of the electrodes. In FIG. 2, the direction of initial alignment of the liquid crystal molecules 105 is inclined counterclockwise by the pretwist angle 108 with respect to the direction of extension of the electrodes, and the liquid crystal molecules 105 are rotated counterclockwise by application of the electric field 106.

In the case of multi-domain alignment in which the alignment direction of the liquid crystal molecules is divided into several domains within the pixel, the direction of rotation of the liquid crystal molecules must be different in each domain. This is accomplished, for example, by varying the initial alignment direction in each domain. FIG. 3 depicts a conventional liquid crystal display apparatus in which the initial alignment direction of the liquid crystal molecules differs between two regions of a pixel. As shown in FIG. 3, the pixel is provided with a comb-shaped common electrode 111 and pixel electrode 112, an electric field 116 is applied in a direction perpendicular to the direction of extension of the common electrode 111 and the pixel electrode 112, and the display region between the electrodes is divided into sub-domains 113, 114 by differences in the state of the initial alignment of the liquid crystal molecules. Specifically, in the sub-domain 113, the initial alignment direction 117a of the liquid crystal molecules is inclined counterclockwise by the pretwist angle 118 with respect to the direction of extension of the electrodes, whereas in the sub-domain 114, the initial alignment direction 117b of the liquid crystal molecules is inclined clockwise by the pretwist angle 118 with respect to the direction of extension of the electrodes. Application of the electric field 116 causes the liquid crystal molecules 115 to rotate in the counterclockwise direction in the sub-domain 113 and in the clockwise direction in the sub-domain 114, assuming different alignment states. In this way, the liquid crystal molecules in the individual sub-domains are provided with opposite directions of rotation by the two different initial alignment directions 117a, 117b and compensate for each another, suppressing color shift in the diagonal direction. However, special techniques such as segmented rubbing or photo-alignment are required, and throughput is low while costs are high.

For this reason, the usual method is to curve the electrodes themselves instead of varying the initial alignment direction of the liquid crystals, as disclosed in Patent Document 1 (Japanese Patent No. 3120751). FIG. 4 is a plan view schematically showing the liquid crystal display apparatus disclosed in Patent Document 1. As shown in FIG. 4, the common electrode 121 and the pixel electrode 122 are curved in a "V" shape at the boundary of the sub-domains 123, 124 while keeping each sub-domain parallel with itself. While the initial alignment direction 127 of the liquid crystals is the same in one direction, the direction of application of the horizontal electric field 126 differs for each sub-domain, and the liquid crystal molecules 125 will therefore have mutually opposite directions of rotation. Specifically, the liquid crystal molecules 125 in the sub-domain 123 will rotate in the counterclockwise direction, whereas the liquid crystal molecules 125 in the sub-domain 124 will rotate in the clockwise direction. This prior art technique also facilitates alignment by the rubbing technique.

Patent Document 2 (Japanese Patent No. 3132483) discloses means for achieving multi-domain alignment with a pretwist angle of 0 degrees. FIG. 5 is a plan view schematically showing the configuration of the in-plane switching liquid crystal display apparatus disclosed in Patent Document 2. As shown in FIG. 5, a common electrode 131 and a pixel electrode 132 are composed of a parallel electrode portion extending in the initial alignment direction 137 of the liquid crystals, and an orthogonal electrode portion 139 extending in a direction orthogonal thereto. The pixel is composed of sub-domains within the liquid crystal layer partitioned by the parallel electrode portion and the orthogonal electrode portion 139. In FIG. 5, the pixel is divided into sub-domains 133, 134 by the orthogonal electrode portion 139 of the pixel electrode 132, and each domain is further divided into two sub-domains by the parallel electrode portion of the pixel electrode 132. With this structure, the pattern of the horizontal electric field 136 produced across the electrodes differs in alternating fashion for the individual sub-domains. In this way, the initial alignment direction 127 of the liquid crystals is parallel to the parallel electrode portion, and the pretwist angle is 0 degrees. However, the direction of rotation of the liquid crystal molecules is made uniform within each sub-domain by providing the orthogonal electrode portion 139, with the direction of rotation being mutually opposite for individual sub-domains.

In connection with the in-plane switching liquid crystal display apparatus disclosed in Patent Document 3 (WO99/45430), an embodiment is described in which portions of the common electrode and the pixel electrode provided in each pixel region are curved. For example, the common electrode and the pixel electrode are composed of a parallel electrode portion extending parallel with the picture signal line, and an inclined electrode portion inclined with respect to the picture signal line, with the inclined electrode portion formed at an end of the parallel electrode portion. The parallel electrode portion occupies most of the electrode, with the inclined electrode portion being part of the whole. With this electrode structure, the pixel region between the common electrode and the pixel electrode is divided into a first sub-domain corresponding to the parallel electrode portions and a second sub-domain corresponding to the inclined electrode portions, with the electric field direction differing between the two sub-domains. It is disclosed that the initial alignment direction of the liquid crystal molecules is a prescribed direction that is shared by the two sub-domains, with the angle thereof being 15 degrees with respect to the direction of extension of the parallel electrode portion, requiring a pre-tilt angle that is not 0 degrees.

However, the prior art discussed above has a number of problems such as the following.

In the prior art illustrated in FIGS. 2 to 4, it is essential that the initial alignment direction of the liquid crystal molecules be inclined with respect to the direction of extension of the comb-shaped electrodes. In cases in which the comb-shaped electrodes are formed from a metal film, a difference in level produced by the metal film will become a problem. At a minimum, this difference in level is approximately several thousand angstroms. In the case of the rubbing technique, which represents the most common aligning means, deviation of the alignment direction occurs in proximity to areas of level difference, causing light leakage in the black state. A resultant problem is that contrast is lower.

In the prior art disclosed in Patent Document 2, while the initial alignment direction is parallel to the parallel electrode portion which lies in the direction of extension of the comb-shaped electrodes, it is perpendicular to the orthogonal electrode portion 139. Accordingly, with the rubbing technique there is the problem of a possible increase in light leakage, and further disadvantages in terms of contrast.

In the prior art disclosed in Patent Document 3, a structure is described in which part of the electrode is curved in similar fashion to the invention herein. However, the initial alignment direction is inclined with respect to the direction of extension of the parallel electrode portion, creating the problem of lower contrast with the rubbing technique, similar to that discussed above.

In cases in which the material of the comb-shaped electrodes is a transparent conductive film such as Indium Tin Oxide (ITO) rather than a metal film, the level difference produced by the film is approximately 400 Å, and the level difference is therefore rather small. However, requirements for high contrast have become very stringent in recent years, to the point that the slight leakage of light produced by a small level difference can no longer be ignored.

SUMMARY OF THE INVENTION

It is accordingly an object of the present invention to provide an in-plane switching liquid crystal display apparatus that has a high aperture ratio and high contrast as a result of a simple electrode structure.

The in-plane switching liquid crystal display apparatus in accordance with the present invention has a first substrate, a second substrate facing the first substrate, a liquid crystal layer disposed between the first substrate and the second substrate, and a pixel electrode and common electrode that are formed on the first substrate on the surface thereof facing the second substrate and that produce an electric field parallel to the first substrate, wherein the shapes of the pixel electrode and the common electrode are established so that the pixel region between the pixel electrode and the common electrode has formed therein a principal portion whose electric field direction is orthogonal to the initial alignment direction of the liquid crystal molecules, and a specific portion that is smaller than the principal portion and whose electric field is not orthogonal.

The specific portion can be one whose direction of extension of the pixel electrode and the common electrode is inclined with respect to the direction of extension thereof in the principal portion.

The specific portion is preferably one whose direction of extension of the pixel electrode and the common electrode is inclined by 15 to 45 degrees with respect to the direction of extension thereof in the principal portion.

The surface area of the specific portion is preferably 10 percent or less of the surface area of the principal portion.

The specific portions may be provided to the distal portion of an electrode selected from the pixel electrode and the common electrode, and to the basal portion of the other electrode.

The specific portions may be two locations at each distal portion and basal portion of the pixel electrode and the common electrode.

The directions of the incline of the pixel electrode and the common electrode in the specific portions are preferably mutually opposite in the specific portions provided at two locations.

The specific portions may be disposed in the medial portion of the pixel electrode and the common electrode, and a medial portion of the pixel electrode and the common electrode may have a chevron shape.

The specific portions may be the medial portion as well as two locations at each distal portion and basal portion of the pixel electrode and the common electrode.

The specific portions may be disposed in the medial portion of the pixel electrode and the common electrode, and a medial portion of either the pixel electrode or the common electrode may have a chevron shape and a reversed chevron shape produced by the mirror reversal thereof, and the other may be diamond-shaped.

The first substrate may be an active matrix substrate having a plurality of scan signal lines, a plurality of picture signal lines intersecting these scan signal lines in a matrix configuration, a thin film transistor formed in each of the pixel regions defined by these scan signal lines and picture signal lines, and a plurality of common signal lines that are parallel to the scan signal lines and impart a reference potential across a plurality of pixels, wherein the common electrodes are connected to the common signal lines, and the pixel electrodes, the scan signal lines, and the picture signal lines are connected to the thin film transistors formed on the pixels.

Either the pixel electrodes or the common electrodes, or both, may be formed of metal film.

In accordance with the present invention, the pretwist angle of the liquid crystal molecules is set to 0 degrees in the pixel region between the pixel electrode and the common electrode; and the shapes of the pixel electrode and the common electrode are established so as to form a principal portion whose electric field direction is orthogonal to the initial alignment direction of the liquid crystal molecules, and a specific portion that is smaller than the principal portion and whose electric field is not orthogonal, whereby the alignment of the liquid crystal molecules in the specific portion is uniformly changed by the electric field, and the alignment of the liquid crystal molecules in the principal portion also changes in conformity with the uniform change. Since the initial alignment direction of the liquid crystal molecules in the principal portion is parallel to the common electrode and the pixel electrode, aligning is facilitated. In cases in which the rubbing technique is used for initial alignment, the rubbing direction and the direction of extension of the electrodes are for the most part parallel, making it possible to avoid the problem of deviation in alignment direction in proximity to areas of level difference produced by the electrode film. Moreover, since the specific portion occupies only a small proportion of the pixel region, there is substantially no effect of light leakage in the black state. Accordingly, it is possible to achieve a liquid crystal display apparatus having high contrast and high picture quality.

DESCRIPTION OF THE PREFERRED EMBODIMENTS

Figure 1:
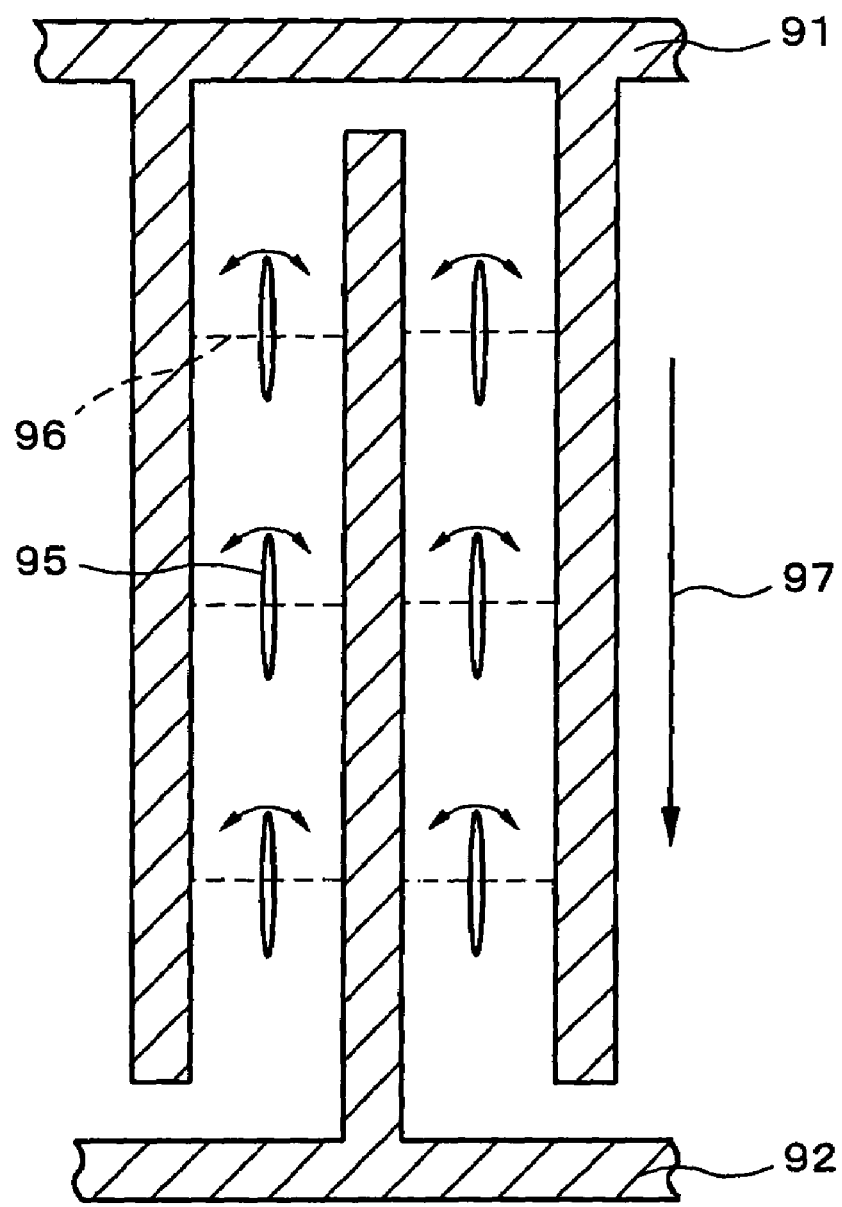
FIG. 1 is a schematic plan view illustrating the need for a pretwist angle in a conventional liquid crystal display apparatus.
Figure 2:
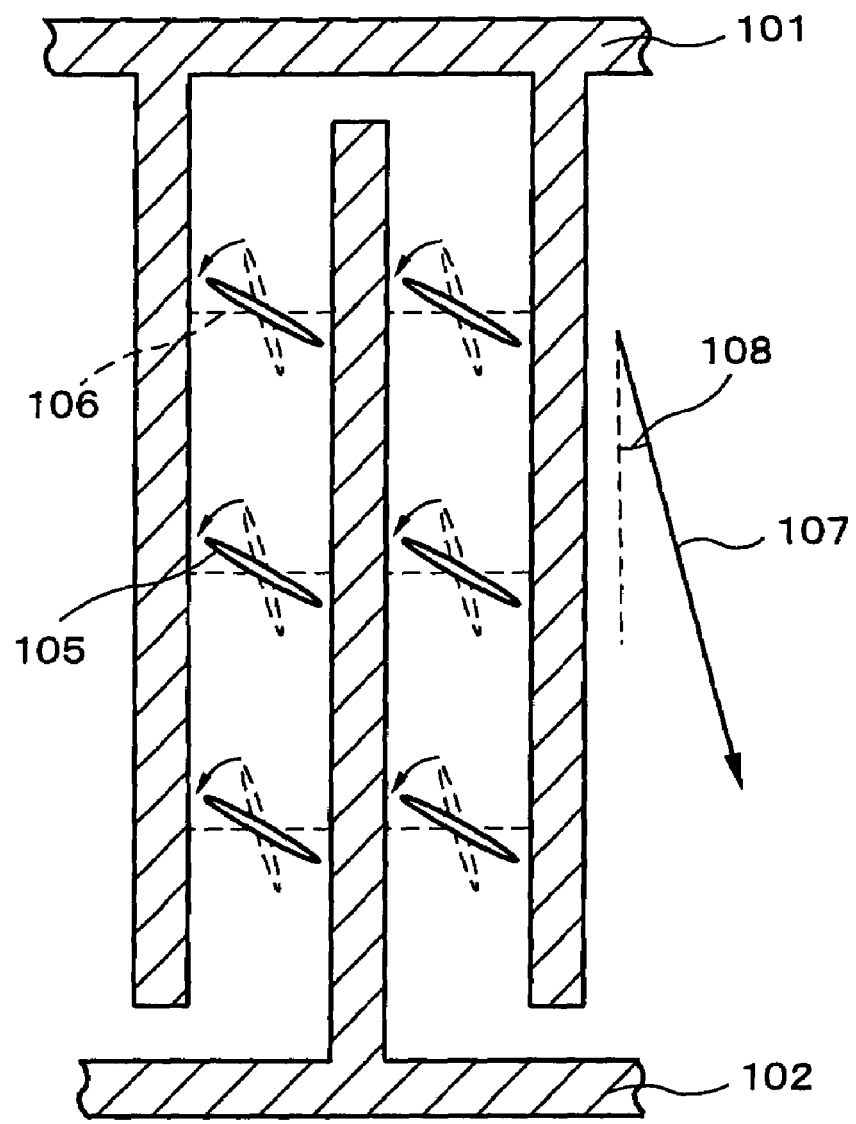
FIG. 2 is a schematic plan view showing a pixel of a first conventional liquid crystal display apparatus.
Figure 3:
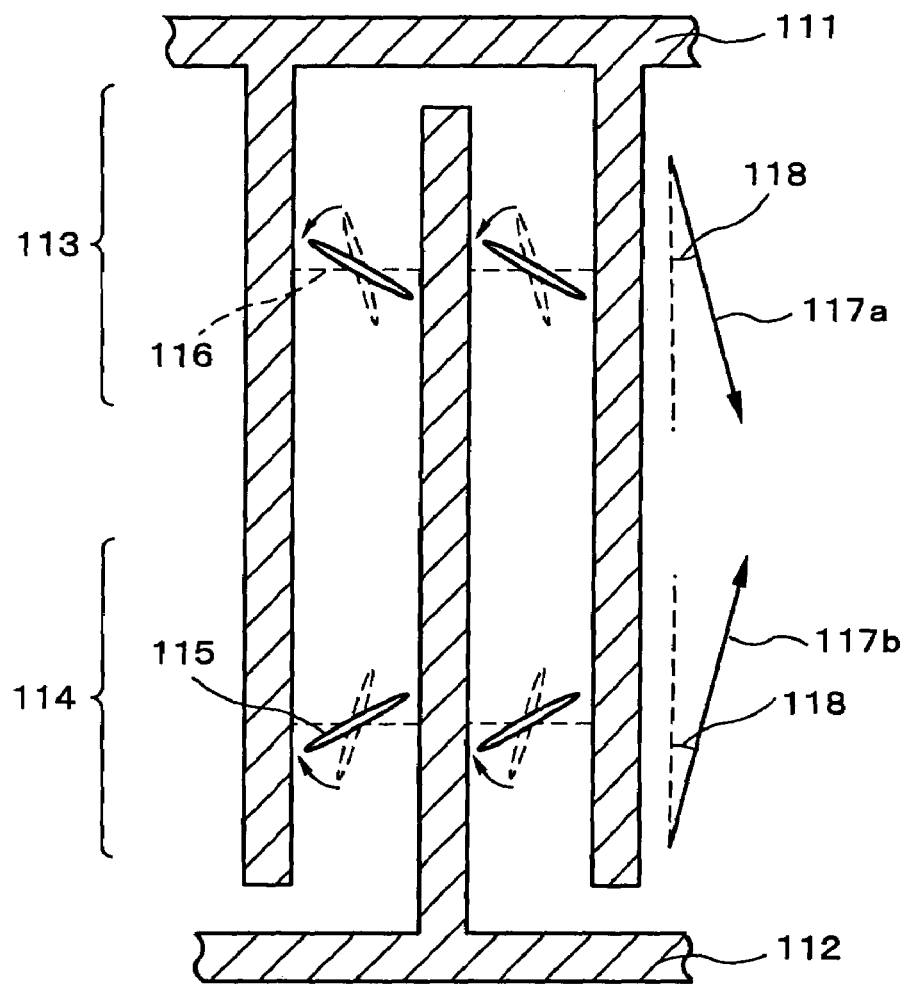
FIG. 3 is a schematic plan view showing a pixel of a second conventional liquid crystal display apparatus.
Figure 4:
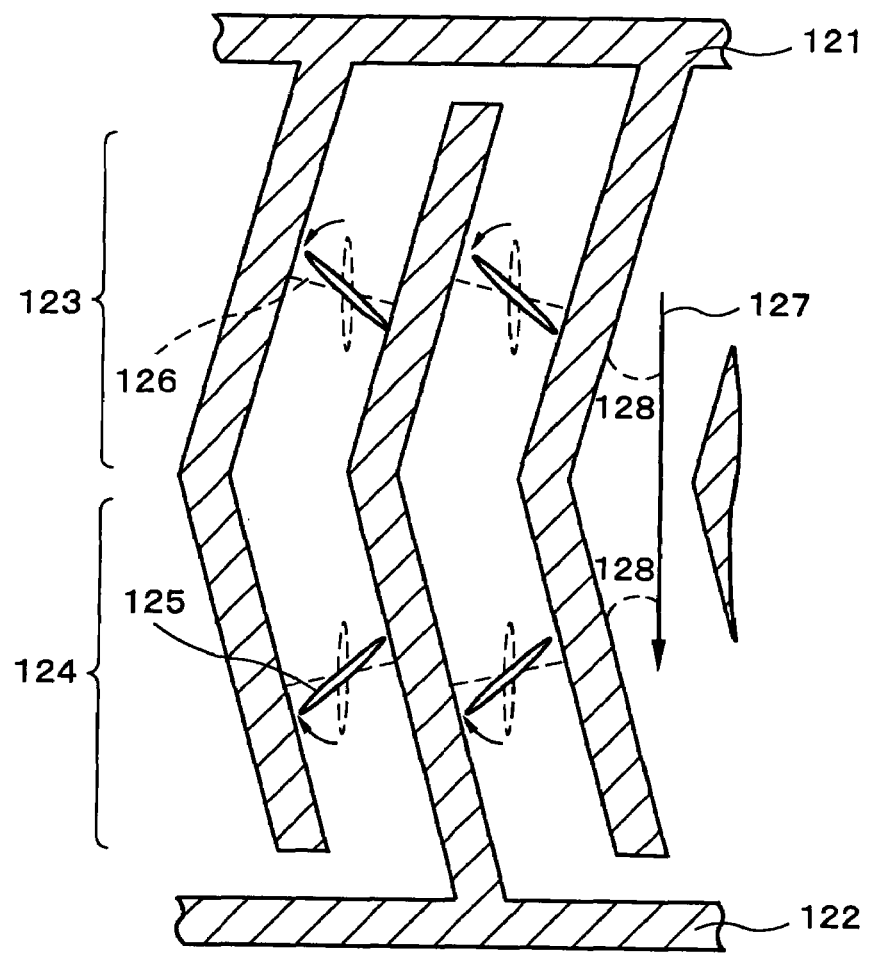
FIG. 4 is a plan view schematically showing the liquid crystal display apparatus disclosed in Patent Document 1.
Figure 5:
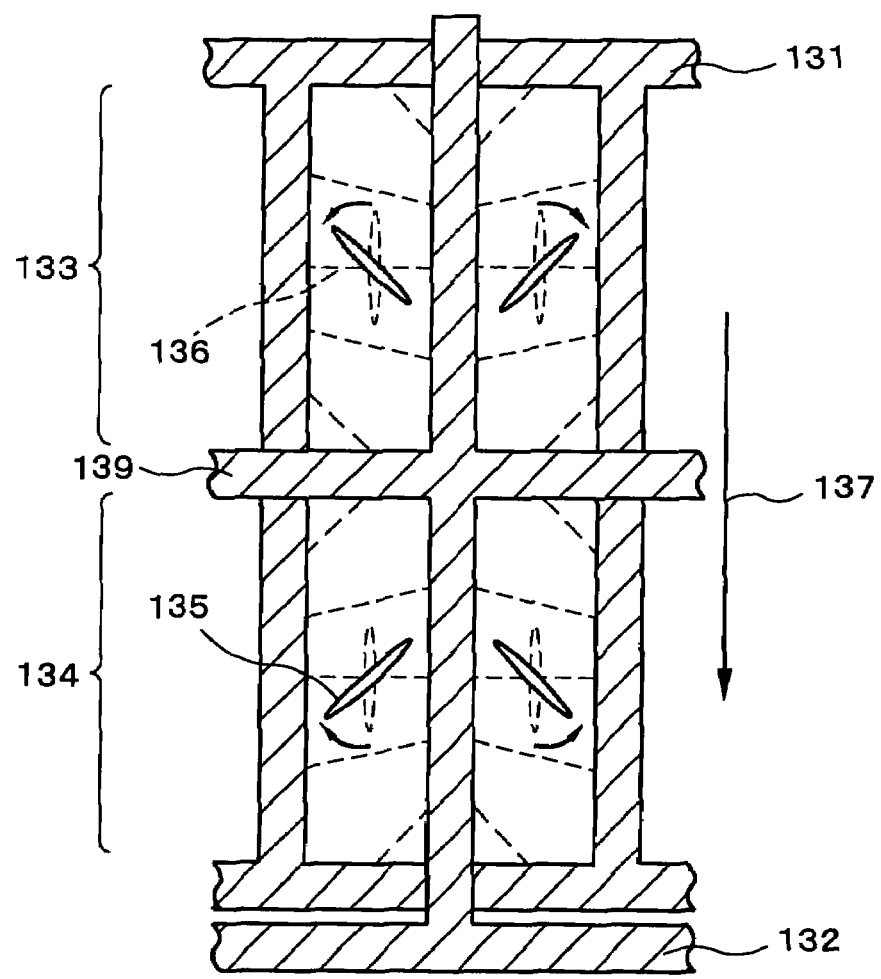
FIG. 5 is a plan view schematically showing the configuration of the in-field switching liquid crystal display apparatus disclosed in Patent Document 2.
Figure 6:
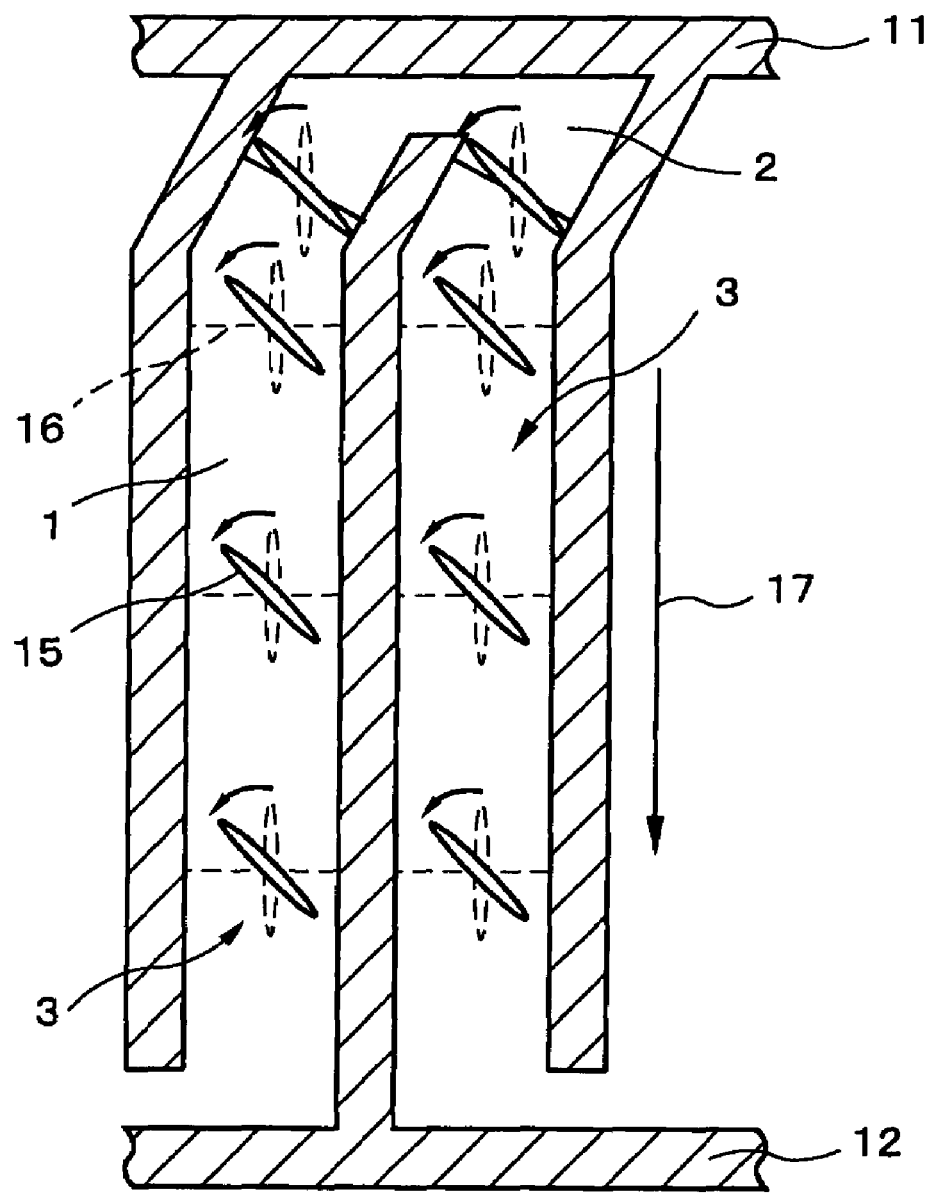
FIG. 6 is a schematic plan view showing a pixel of a liquid crystal display apparatus in accordance with a first embodiment of the present invention.

The embodiments of the present invention will be described in detail hereinbelow with reference to the accompanying drawings. First, the liquid crystal display apparatus in accordance with a first embodiment of the present invention will be described. FIG. 6 is a schematic plan view showing a pixel of the liquid crystal display apparatus in accordance with the present embodiment. The plan views illustrating the embodiments herein are schematic diagrams representing the display region only.

The liquid crystal display apparatus in accordance with the embodiments of the present invention is an in-plane switching liquid crystal display apparatus that operates on an active matrix principle and has a liquid crystal layer sandwiched between a pair of opposing substrates, a display region composed of multiple pixels formed on the substrate surfaces, and a pixel electrode and common electrode formed in each pixel region on the surface of one of the substrates. An electric field substantially parallel to the substrate is generated between the electrodes, whereby the liquid crystal molecules of the liquid crystal layer are caused to rotate within a plane parallel to the substrate, and display is carried out by controlling the quantity of light passing through the liquid crystal layer. A plurality of scan signal lines, a plurality of common signal lines parallel to the scan signal lines, and a plurality of picture signal lines intersecting the scan signal lines are formed on the substrate; common electrodes that are connected to the pixel electrodes and the common signal lines and that impart a reference potential across multiple pixels are formed in the multiple pixel regions divided in a matrix configuration by the scan signal lines and the picture signal lines; and the scan signal lines, the picture signal lines, and the pixel electrodes are connected to TFTs (Thin Film Transistors) formed in proximity to the intersection points of the scan signal lines and the picture signal lines of the pixels.

As shown in FIG. 6, a comb-shaped common electrode 11 and a pixel electrode 12 are disposed mutually parallel in an interlocking fashion in a pixel, with the electrodes respectively having two or one electrode portions of band shape which extend in the vertical direction of the drawing, arranged so that the single extending pixel electrode 12 is positioned in opposition between a pair of extending electrode portions of the common electrode 11. The common electrode 11 and the pixel electrode 12 form columns 3 enclosed therein, with liquid crystal molecules 15 being arranged within each column. The initial alignment direction 17 of the liquid crystal molecules is constant for the columns 3.

The pixel region between the common electrode 11 and the pixel electrode 12 is composed of a principal portion 1 in which the direction of extension of the common electrode 11 and the pixel electrode 12 is parallel with the liquid crystal molecule initial alignment direction 17, and a specific portion 2 in which the direction of extension is not parallel with the liquid crystal molecule initial alignment direction 17. In the specific portion 2, the distal portion of the pixel electrode 12 and the basal portion of the common electrode 11 are mutually parallel and inclined by a prescribed angle with respect to the liquid crystal molecule initial alignment direction 17, and the lengthwise direction of the columns 3 within the specific portion 2 is inclined diagonally rightward with respect to the lengthwise direction of the columns 3 within the principal portion 1. The specific portion 2 preferably occupies 10% or less of the total area in the columns 3. That is, the principal portion 1 will occupy a major part of the columns 3.

For this reason, when voltage is applied across the common electrode 11 and the pixel electrode 12 to generate an electric field, the horizontal electric field 16 will be perpendicular to the liquid crystal molecule initial alignment direction 17 within the principal portion 1 that occupies the major part of the columns 3, whereas the field will not be perpendicular within the specific portion 2.

Next, the operation of the present embodiment will be described. In the absence of applied voltage, the liquid crystal molecules 15 face in the initial alignment direction 17. Voltage is applied across the common electrode 11 and the pixel electrode 12, generating the horizontal electric field 16. In the principal portion 1, since the horizontal electric field 16 is orthogonal to the liquid crystal molecule initial alignment direction 17, the direction of rotation of the liquid crystal molecules 15 is not fixed. In the specific portion 2 of the columns 3, on the other hand, the horizontal electric field 16 is not orthogonal to the liquid crystal molecule initial alignment direction 17. Therefore, the liquid crystal molecules 15 rotate in the counterclockwise direction so as to reduce the angle of incline of the liquid crystal molecular axes with respect to the horizontal electric field 16, and the direction of alignment of the molecules changes. Next, in conformity with the change in the direction of alignment, a uniform change also occurs in the direction of alignment of the liquid crystal molecules 15 within the principal portion 1 that occupies the major part of the columns 3. Specifically, the direction of rotation of the liquid crystal molecules 15 within the principal portion 1 is made uniform by the distortion of the horizontal electric field 16 in the specific portion 2.

Next, the effects of the present embodiment will be discussed. With the configuration described above, the liquid crystal molecules 15 within the principal portion 1 that occupies the major part of the columns 3 have a pretwist angle of 0 degrees, and good alignment may therefore be achieved even in cases in which the rubbing technique is used. Specifically, since the rubbing direction and the direction of extension of the electrodes are for the most part parallel, it is possible to avoid the problem of deviation in alignment direction in proximity to areas of level difference as a result of a level difference of the electrode film. Moreover, the action of the specific portion 2 makes the rotation direction of the liquid crystal molecules 15 uniform through the columns 3 as a whole, and picture quality is therefore not diminished. Furthermore, the specific portion 2 occupies only a small proportion of the columns 3 as a whole, and there is therefore substantially no effect of light leakage in the black state. Accordingly, it is possible to achieve high contrast.

In FIG. 6, in order to facilitate understanding of the present invention, the specific portion 2 is depicted as occupying a relatively large proportion of the total length of the columns 3. In actual practice, however, the specific portion 2 will occupy no more than 10 percent of the total length of the columns 3, for example.

Figure 7:
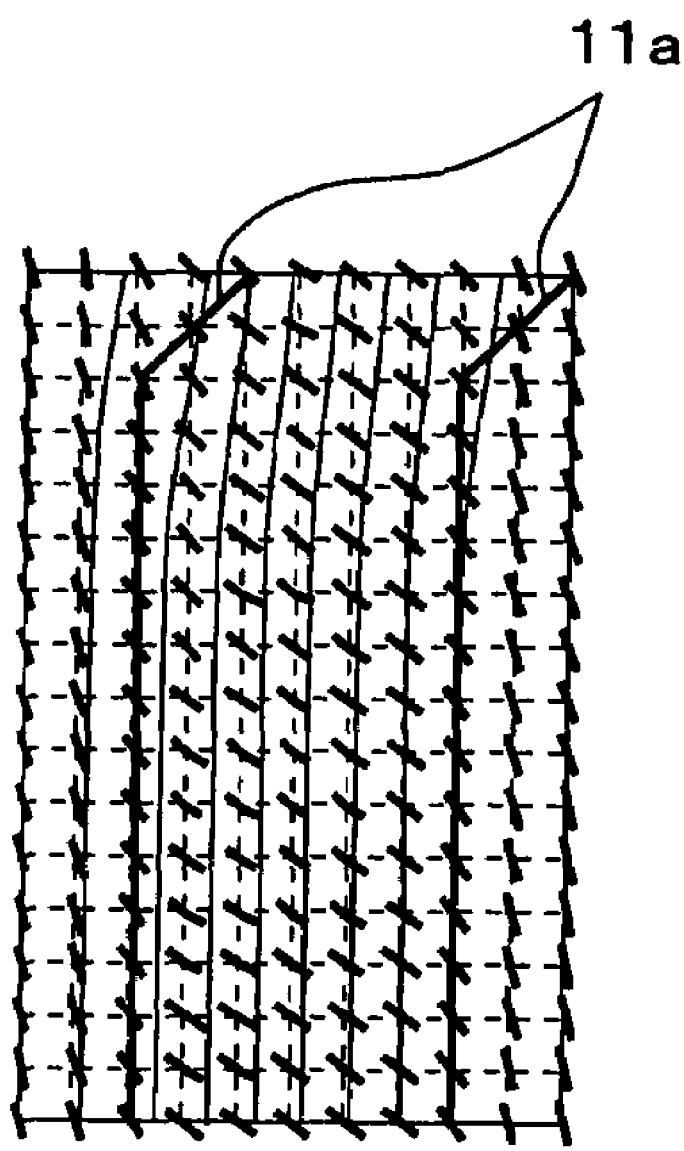
FIG. 7 is a simulation result of liquid crystal alignment in the first embodiment.

A simulation result of liquid crystal alignment in the first embodiment is shown in FIG. 7. As depicted in FIG. 7, the alignment direction of the liquid crystal molecules between the common electrode locations 11a is substantially uniform, and the action of the specific portion 2 causes the rotation direction of the liquid crystal molecules to be uniform as well.

Figure 8:
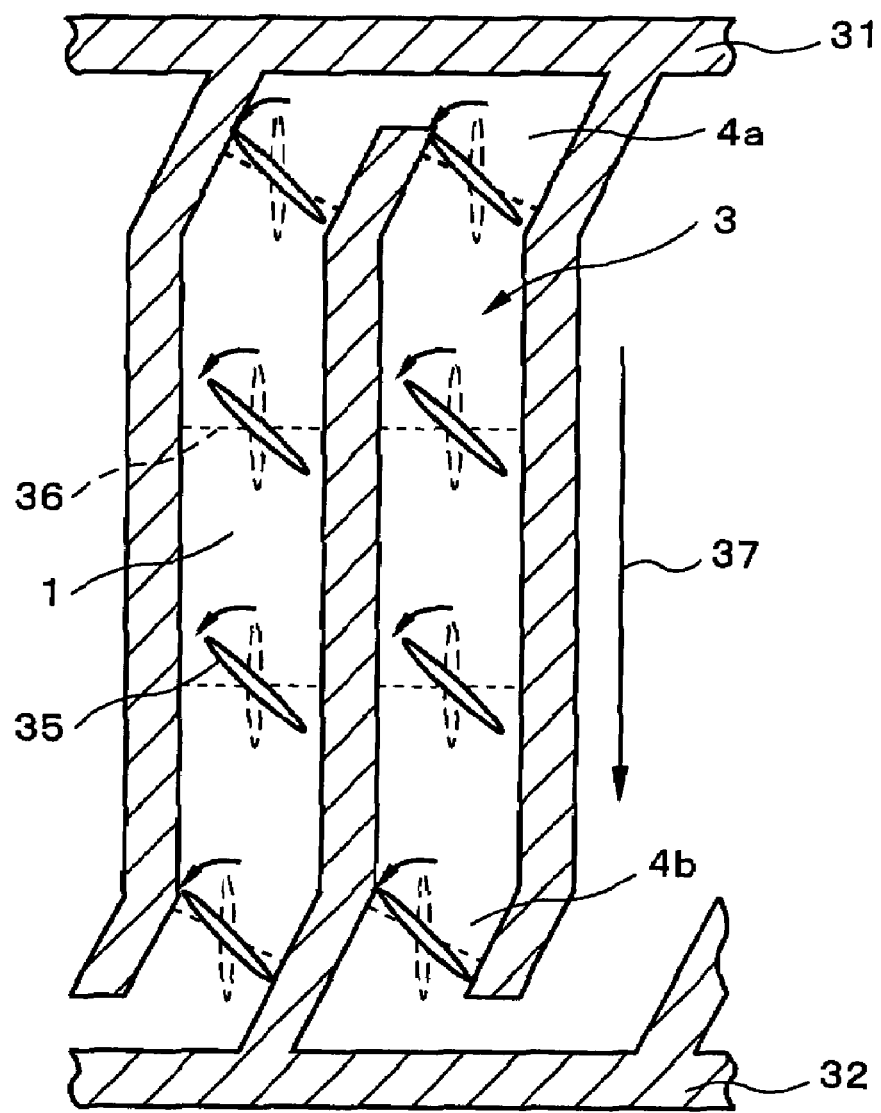
FIG. 8 is a schematic plan view showing a pixel of a liquid crystal display apparatus in accordance with a second embodiment of the present invention.

Next, the liquid crystal display apparatus according to the second embodiment of the present invention will be described. FIG. 8 is a schematic plan view showing a pixel of the liquid crystal display apparatus in accordance with the present embodiment. As shown in FIG. 8, a comb-shaped common electrode 31 and pixel electrode 32 are disposed mutually parallel in an interlocking fashion in a pixel to form columns 3 enclosed by the common electrode 31 and the pixel electrode 32. The initial alignment direction 37 of the liquid crystal molecules is constant throughout the. columns 3.

The pixel region between the common electrode 31 and the pixel electrode 32 in the present embodiment is composed of a principal portion 1 in which the direction of extension of the common electrode 31 and the pixel electrode 32 is parallel with the liquid crystal molecule initial alignment direction 37, and specific portions 4a, 4b not parallel with the liquid crystal molecule initial alignment direction 37. The specific portion 4a is disposed between the basal portion of the common electrode 31 and the distal portion of the pixel electrode 32, while the specific portion 4b is disposed between the distal portion of the common electrode 31 and the basal portion of the pixel electrode 32. The bending directions of the common electrode 31 and the pixel electrode 32 in the specific portions 4a and 4b are mutually opposite. Therefore, as shown in FIG. 8, the lengthwise directions of the columns 3 are bent in mutually opposite directions with respect to the initial alignment direction 37 of the liquid crystal molecules at the two ends of the columns 3 that extend parallel to the initial alignment direction 37 of the liquid crystal molecules. The principal portion 1 occupies the major part of the columns 3. The specific portions 4a and 4b preferably occupy 10 percent or less of the columns 3.

With this configuration, when voltage is applied across the common electrode 31 and the pixel electrode 32 to generate an electric field, the horizontal electric field 36 will be perpendicular to the liquid crystal molecule initial alignment direction 37 within the principal portion 1 that occupies the major part of the columns 3, whereas the field will not be perpendicular within the specific portions 4a, 4b at the ends of the columns 3.

Next, the operation of the present embodiment will be described. In the absence of applied voltage, the liquid crystal molecules 35 face in the initial alignment direction 37. Voltage is applied across the common electrode 31 and the pixel electrode 32, generating the horizontal electric field 36. In the principal portion 1, since the horizontal electric field 36 is orthogonal to the liquid crystal molecule initial alignment direction 37, the direction of rotation of the liquid crystal molecules 35 is not fixed. In the specific portions 4a, 4b formed at the two ends of the columns 3, on the other hand, the horizontal electric field 36 is not orthogonal to the liquid crystal molecule initial alignment direction 37. Therefore, the liquid crystal molecules 35 rotate in the counterclockwise direction so as to reduce the angle of incline of the liquid crystal molecular axes with respect to the horizontal electric field 36, and there is a change in the direction of alignment of the crystals. In this case, the direction of rotation of the liquid crystal molecules 36 will be the same at both ends of the columns 3. Then, in conformity with the change in the direction of alignment, the liquid crystal molecules 35 within the principal portion 1 that occupies the major part of the columns 3 undergo uniform change in their direction of alignment as well. Specifically, the direction of rotation of the liquid crystal molecules 35 within the principal portion 1 is made uniform by the distortion of the horizontal electric field 16 in the specific portions 4a, 4b.

Next, the effects of the present embodiment will be discussed. The effects of the present embodiment are similar to those of the first embodiment, but since the specific portions 4a, 4b are formed at both ends of the columns 3, the effect of producing a uniform rotation direction in the liquid crystal molecules is even greater than in the first embodiment. Additionally, while the direction of extension of the electrodes in not parallel with the initial alignment direction at the two ends of the columns 3, these electrodes represent only a small proportion of the total length of the columns 3, and even if light leakage should occur in these portions, there is substantially no effect thereby. Accordingly, it is possible to achieve high contrast.

Figure 9:
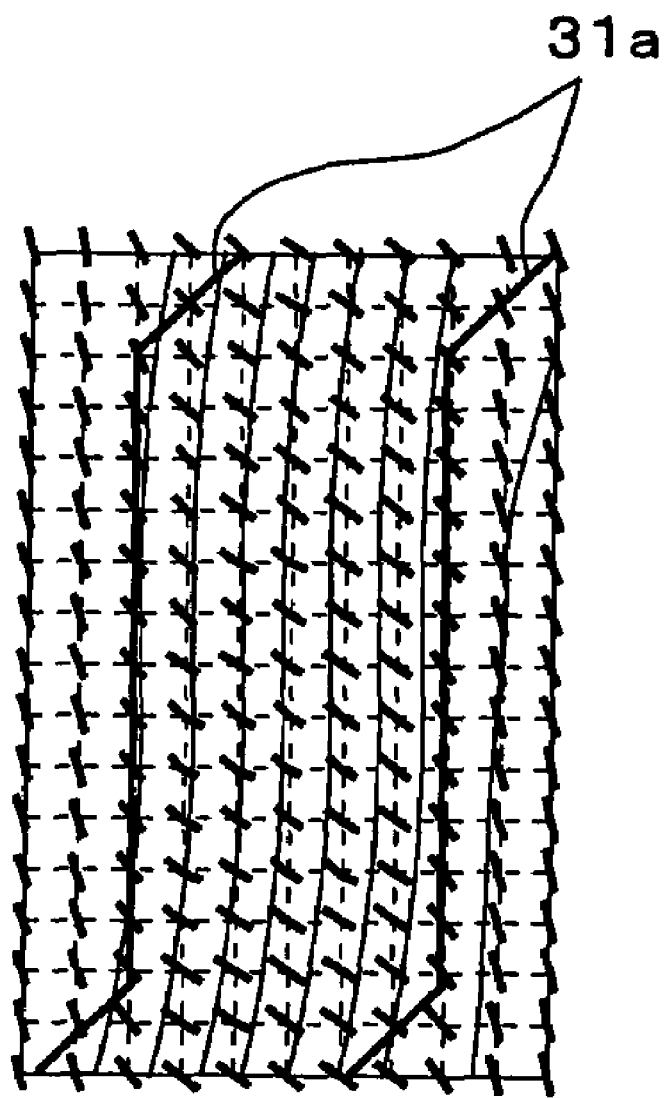
FIG. 9 is a simulation result of liquid crystal alignment in the second embodiment.

A simulation result of liquid crystal alignment in the present embodiment is shown in FIG. 9. As depicted in FIG. 9, the alignment direction of the liquid crystal molecules between the common electrode locations 31a is substantially uniform, and the action of the specific portions formed at the two ends of the column causes the rotation direction of the liquid crystal molecules to be uniform as well.

Figure 10:
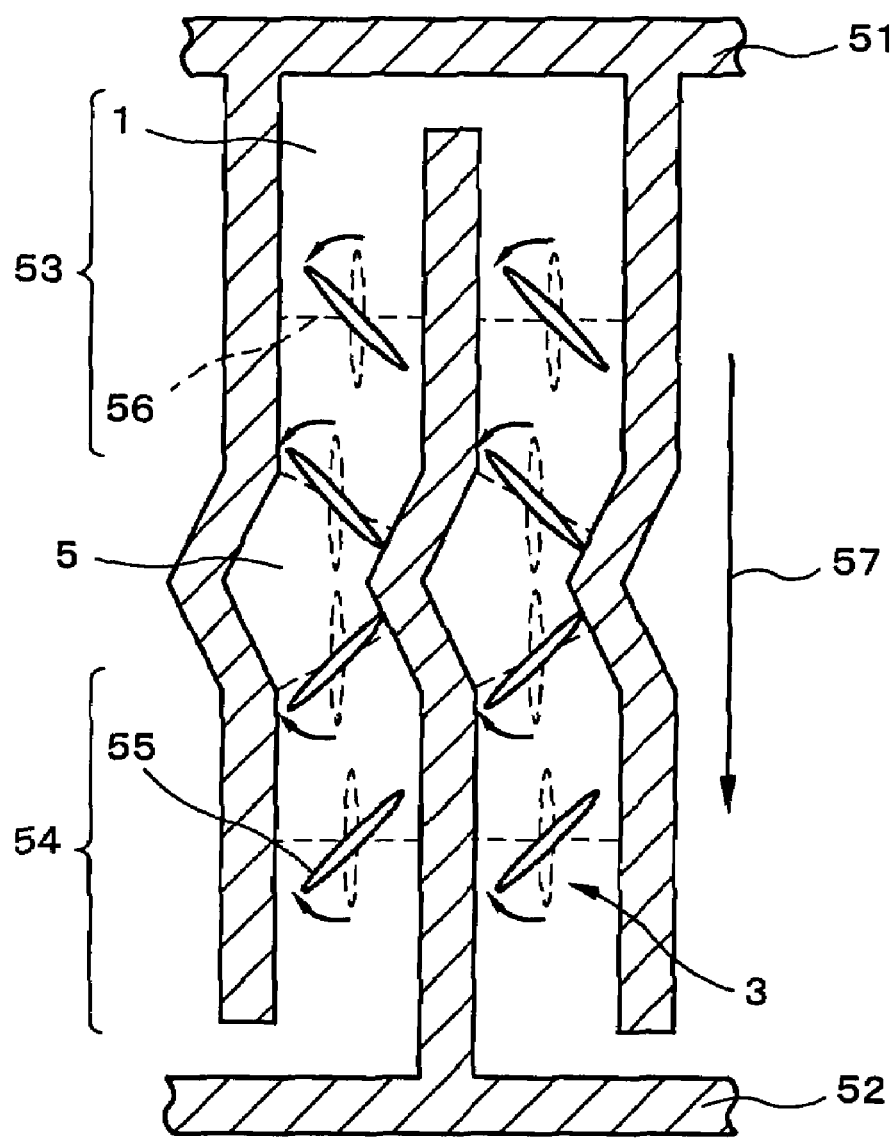
FIG. 10 is a schematic plan view showing a pixel of a liquid crystal display apparatus in accordance with a third embodiment of the present invention.

Next, the third embodiment of the present invention will be described. FIG. 10 is a schematic plan view showing a pixel of the liquid crystal display apparatus in accordance with the present embodiment. As shown in FIG. 10, a comb-shaped common electrode 51 and pixel electrode 52 are disposed mutually parallel in an interlocking fashion in a pixel to form columns 3 enclosed by the common electrode 51 and the pixel electrode 52. The initial alignment direction 57 of the liquid crystal molecules is constant throughout the columns 3.

The pixel region between the common electrode 51 and the pixel electrode 52 in the present embodiment is composed of a principal portion 1 in which the direction of extension of the common electrode 51 and the pixel electrode 52 is parallel with the liquid crystal molecule initial alignment direction 57, and a specific portion 5 not parallel with the liquid crystal molecule initial alignment direction 57. The specific portion 5 is provided in the medial portion of the common electrode 51 and the pixel electrode 52, wherein the electrodes have mutually parallel chevron shapes. The specific portion 5 preferably occupies a portion of the columns 3, such as 10 percent or less.

With this configuration, the principal portion 1 that occupies the major part of the columns 3 extends parallel to the initial alignment direction 57 of the liquid crystal molecules, and the specific portion 5 formed in the medial portion of the columns 3 is bent while keeping mutually parallel chevron shapes.

The operation of the present embodiment will now be described. When voltage is applied across the common electrode 51 and the pixel electrode 52 to generate an electric field, the horizontal electric field 56 is orthogonal to the initial alignment direction 57 of the liquid crystal molecules in the principal portion 1 that occupies the major part of the columns 3. However, the electric field is not orthogonal in the specific portion 5 formed in the middle of the columns 3. Thus, the liquid crystal alignment in the principal portion 1 changes in conformity with the change in liquid crystal alignment in the specific portion 5. The columns 3 are divided to either side of the chevron-shaped specific portion 5 into sub-domains 53, 54 having mutually different directions of rotation of the liquid crystal molecules 55, and the direction of rotation of the liquid crystal molecules is uniform within each sub-domain.

In FIG. 10, the chevron-shaped specific portion 5 is shown provided at a single location in each electrode, but the column could be divided into a larger number of sub-domains when provided at multiple locations. In this case, specific portions having a chevron shape and portions having a reversed chevron shape produced by the mirror reversal thereof would be arranged in alternating fashion.

Next, the effects of the present embodiment will be described. The effects of the present embodiment are similar to those of the first and second embodiments. Furthermore, a multi-domain alignment can be created while keeping the shape of the columns 3 substantially linear, making it possible to simplify the color filter design. While the electrodes are not parallel with the initial alignment direction 57 in the chevron-shaped specific portion 5 in the medial portion of the columns 3, the specific portion represents only a small proportion of the total length of the columns 3, and even if light leakage should occur in this portion, there will be substantially no effect thereby. Accordingly, it is possible to achieve high contrast.

Figure 11:
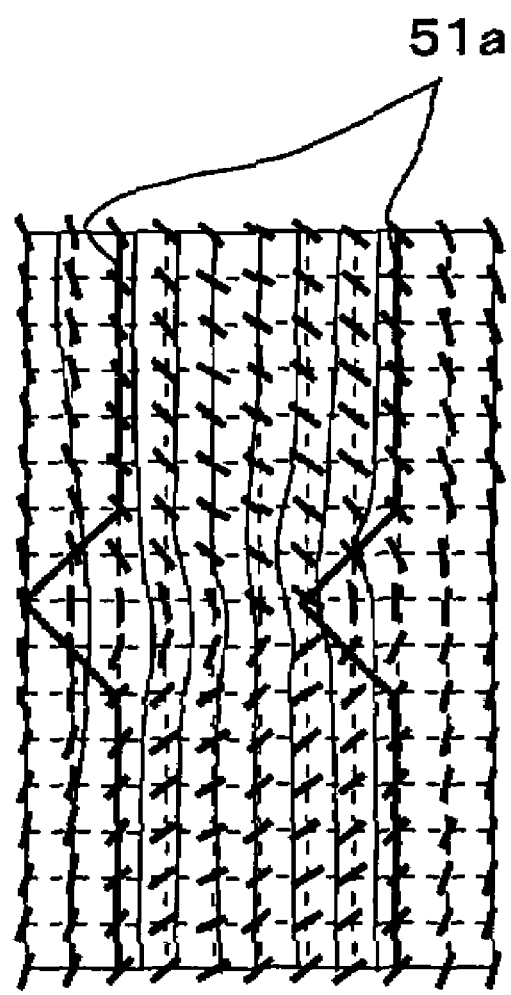
FIG. 11 is a simulation result of liquid crystal alignment in the third embodiment.

A simulation result of liquid crystal alignment in the present embodiment is shown in FIG. 11. As depicted in FIG. 11, it will be apparent that the action of the chevron-shaped specific portion causes the direction of orientation of the liquid crystal molecules between the common electrode locations 51a to be divided into two sub-domains, with the direction of rotation of the liquid crystal molecules within each sub-domain being uniform.

Figure 12:
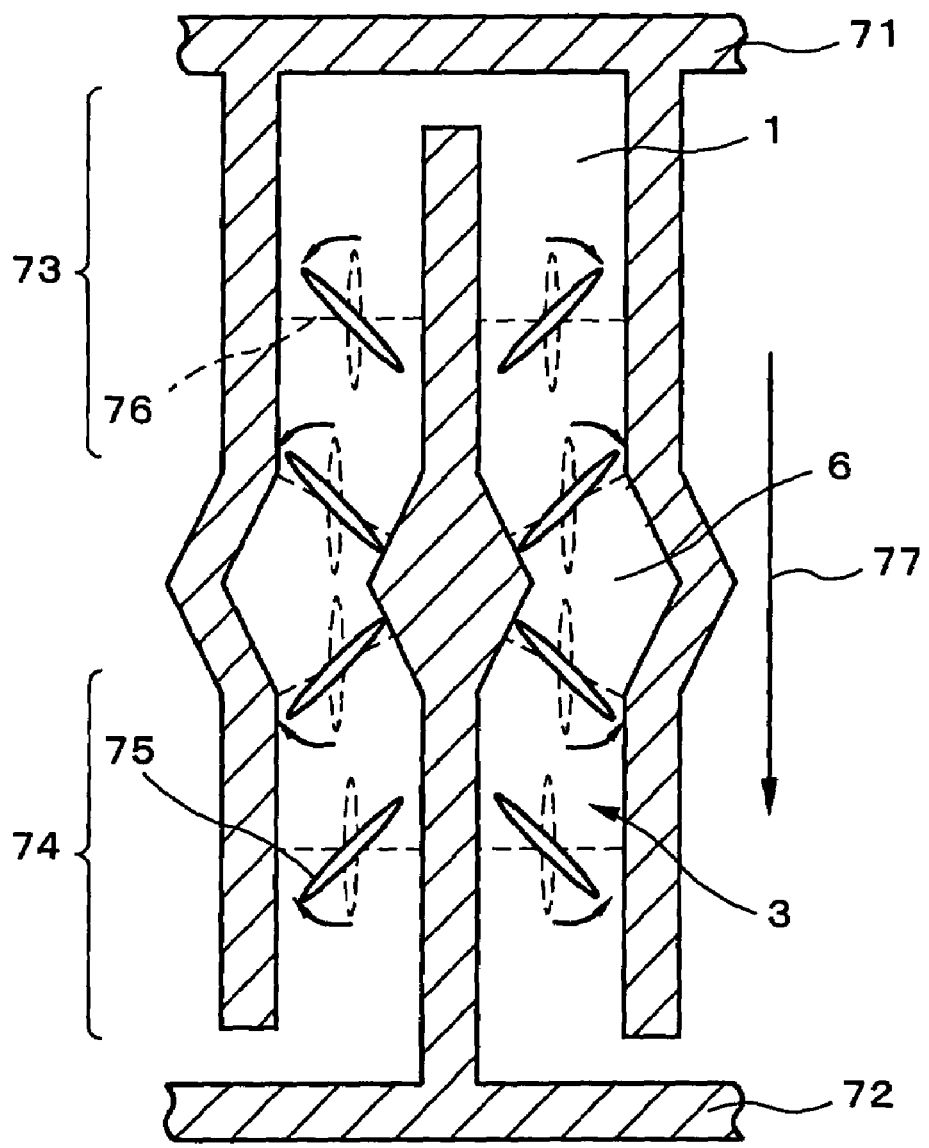
FIG. 12 is a schematic plan view showing a pixel of a liquid crystal display apparatus in accordance with a fourth embodiment of the present invention.

Next, the fourth embodiment of the present invention will be described. FIG. 12 is a schematic plan view showing a pixel of the liquid crystal display apparatus in accordance with the present embodiment. As shown in FIG. 12, a comb-shaped common electrode 71 and pixel electrode 72 in a pixel are disposed in a mutually interlocking fashion to form columns 3 enclosed by the common electrode 71 and the pixel electrode 72. The initial alignment direction 77 of the liquid crystal molecules is constant throughout the columns 3.

The configuration of the electrodes in the present embodiment is similar to the configuration of the electrodes in the third embodiment. Of the pair of electrodes belonging to the common electrode 71, the medial portion of the electrode on the left side in the drawing is formed in a chevron shape, while the medial portion of the electrode on the left side in the drawing is formed with a reversed chevron shape produced by the mirror reversal of the initial chevron shape. The pixel electrode 72 positioned between this pair of electrodes generally has a diamond shape in its medial portion, and the contours of the diamond shape are mutually parallel to the facing chevron and reverse chevron shapes. In the present embodiment, the pixel region between the common electrode 71 and the pixel electrode 72 is composed of a principal portion 1 in which the direction of extension of the common electrode 71 and the pixel electrode 72 is parallel with the liquid crystal molecule initial alignment direction 77, and a specific portion 6 not parallel with the liquid crystal molecule initial alignment direction 77. The specific portion 6 is a region that has chevron and reverse chevron shapes and is provided in the medial portions of the common electrode 71 and the pixel electrode 72.

With this configuration, sub-domains 73, 74 in which the liquid crystal molecules have mutually opposite directions of orientation, and which are disposed to either side of the chevron- and reverse chevron-shaped specific portion 6 in the electrode medial portion, are formed in the vertical direction in the drawing. The direction of orientation of the liquid crystal molecules can also be reversed between the columns 3 at left and right in the drawing. This has the effect of increasing the compensating effect when viewed on the diagonal. The operation and effect of the present embodiment are otherwise substantially the same as the operation and effect of the first through third embodiments.

Figure 13:
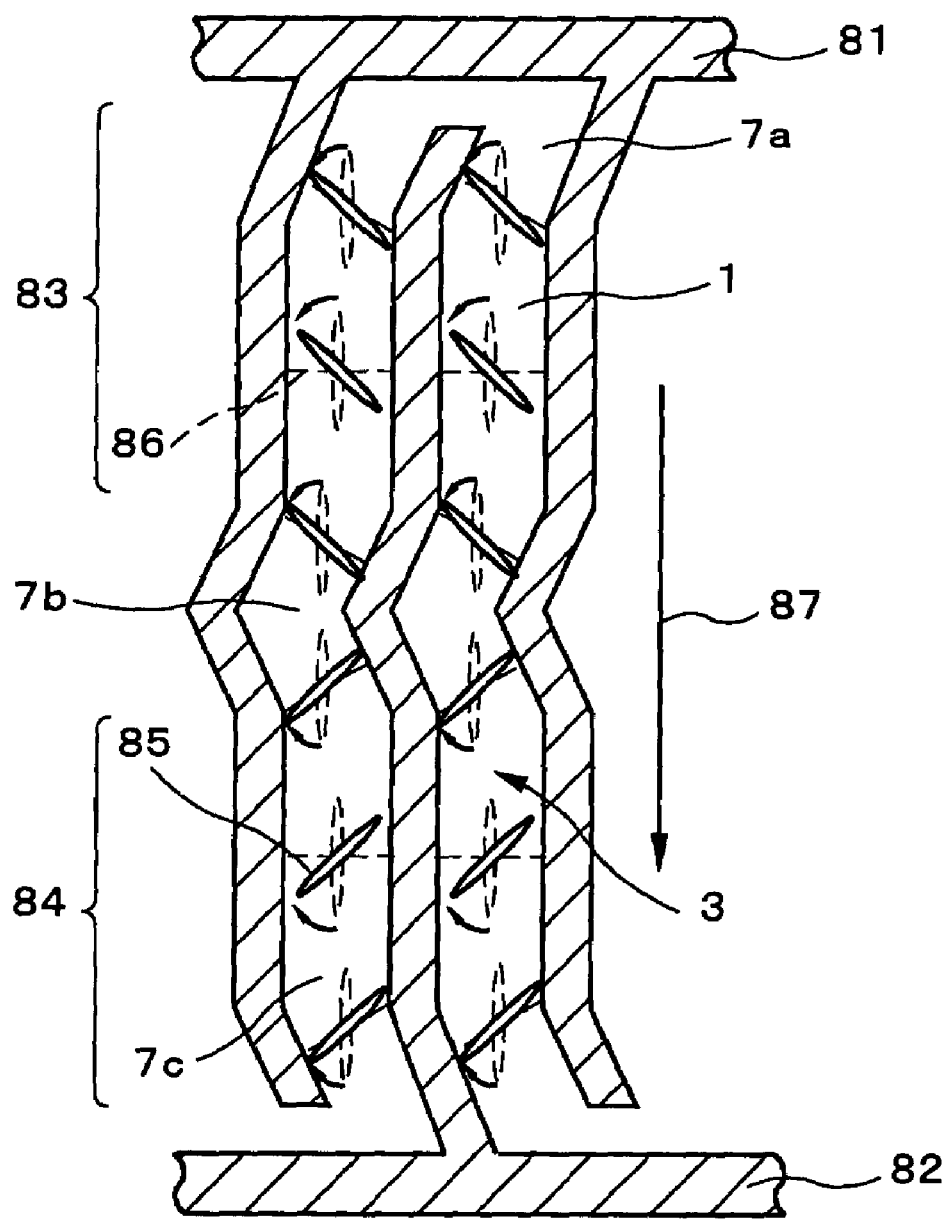
FIG. 13 is a schematic plan view showing a pixel of a liquid crystal display apparatus in accordance with a fifth embodiment of the present invention.

Next, the fifth embodiment of the present invention will be described with reference to FIG. 13. FIG. 13 is a schematic plan view showing a pixel of the liquid crystal display apparatus in accordance with the present embodiment. As shown in FIG. 13, a comb-shaped common electrode 81 and pixel electrode 82 in a pixel are disposed mutually parallel in an interlocking fashion to form columns 3 enclosed by the common electrode 81 and the pixel electrode 82. The initial alignment direction 87 of the liquid crystal molecules is constant throughout the columns 3.

In the present embodiment, the pixel region between the common electrode 81 and the pixel electrode 82 is composed of a principal portion 1 in which the direction of extension of the common electrode 81 and the pixel electrode 82 is parallel with the liquid crystal molecule initial alignment direction 87, and specific portions 7a, 7b, 7c not parallel with the liquid crystal molecule initial alignment direction 87. The specific portion 7a is disposed between the basal portion of the common electrode 81 and the distal portion of the pixel electrode 82, while the specific portion 7c is disposed between the distal portion of the common electrode 81 and the basal portion of the pixel electrode 82. The specific portion 7b is disposed in the medial portion of the common electrode 81 and the pixel electrode 82, forming mutually parallel chevron shapes. The distal portions and the basal portions of the electrodes are inclined so that the bending directions of specific portions 7a, 7b formed at the two ends of the columns 3 are the same. The specific portion 7b divides the columns 3 into sub-domains 83 and 84, and when a horizontal electric field 86 is applied, the directions of rotation of the liquid crystal molecules 85 mutually differ between these regions.

With the above configuration, a multi-domain alignment is possible while keeping the shape of the columns 3 substantially linear; design of a color filter is simple as well; and it is possible to further stabilize the direction of rotation of the liquid crystal molecules within each sub-domain. The operation and effect of the present embodiment are otherwise substantially the same as the operation and effect of the first through fourth embodiments.

While the preceding embodiments of the present invention described a configuration in which the number of electrode portions extending in the vertical direction is two for the common electrode and one for the pixel electrode, and in which the pixel electrode is positioned facing the common electrode between the pair of electrode portions thereof, the invention is not limited to this arrangement and can have a plurality of electrode portions within a single pixel.

In the first to fifth embodiments described in detail herein, the angle of the specific portion(s) may be about the same as the pretwist angle in the prior art; for example, about 15 degrees or more. It is apparent from simulations that the larger the angle is, the greater the effect of maintaining a uniform direction for the rotation of the liquid crystal molecules, and the driving voltage is somewhat lower.

However, if the angle exceeds 45 degrees, the chevron-shaped specific portion will have an acute angle and will be difficult to form using ordinary TFT (Thin Film Transistor) processes. Moreover, light leakage in the specific portion increases with larger angles. Thus, even though the specific portion occupies only a small proportion of total column length, effects on contrast are a concern.

Considerations such as the above make it preferable for the angle of the specific portion to be from 15 to 45 degrees. In actual practice, the particular angle may be determined with some flexibility, according to pixel design. For example, in cases in which the column is narrow, it may be difficult to produce a large angle, in consideration of which an angle of about 15 degrees would be acceptable.

It is preferable for the proportion of total column length occupied by the specific portion to be as small as possible. However, an excessively low proportion will make it difficult to form the portion by ordinary TFT processes, and the effect of obtaining a uniform direction for the rotation of the liquid crystal molecules will be lower as well.

Considerations such as the above make it preferable for the proportion of total column length occupied by the specific portion to be 10 percent or less. The structure may be determined with some flexibility, according to pixel design. For example, in cases in which the total column width is reduced, such as with a compact product or high-precision product, the end of one of the columns may be bent in the manner of the first embodiment. In cases in which the total column width is considerable, such as with a TV or the like, a plurality of chevron-shaped specific portions may be provided to produce a multi-domain alignment.

In the present invention, there is a significant advantage to forming either the common electrodes or the pixel electrodes, or both, from metal film. The reason is that since a major part of the initial alignment direction is parallel with the metal film electrodes having level difference, an advantage can be obtained in terms of reducing light leakage, particularly when the rubbing technique is used.

What is claimed is:

1. An in-plane switching liquid crystal display apparatus, comprising:
    a first substrate;
    a second substrate facing the first substrate;
    a liquid crystal layer disposed between said first substrate and said second substrate; and
    a pixel electrode and a common electrode that are formed on said first substrate on the surface thereof facing said second substrate and that produce an electric field parallel to said first substrate,
    wherein the shapes of said pixel electrode and said common electrode are established so that said pixel electrode and said common electrode have parallel uniform extensions with a principal portion and a specific portion, and so that a pixel region between said pixel electrode and said common electrode has formed therein,
    wherein the principal portion whose electric field direction is orthogonal to an initial alignment direction of a plurality of liquid crystal molecules, and
    wherein the specific portion that is smaller in length than the principal portion and whose electric field is not orthogonal to the initial alignment direction of the plurality of liquid crystal molecules.

2. The in-plane switching liquid crystal display apparatus according to claim 1, wherein the specific portion comprises a portion whose direction of extension of the pixel electrode and the common electrode is inclined with respect to a direction of extension thereof in the principal portion.

3. The in-plane switching liquid crystal display apparatus according to claim 2, wherein the specific portion comprises a portion whose direction of extension of the pixel electrode and the common electrode is inclined by 15 to 45 degrees with respect to a direction of extension thereof in the principal portion.

4. The in-plane switching liquid crystal display apparatus according to claim 2, wherein a surface area of said specific portion is 10 percent or less of a surface area of said principal portion.

5. The in-plane switching liquid crystal display apparatus according to claim 3, wherein a surface area of said specific portion is 10 percent or less of a surface area of said principal portion.

6. The in-plane switching liquid crystal display apparatus according to claim 2, wherein said specific portions are provided to a distal portion of an electrode selected from said pixel electrode and said common electrode, and to a basal portion of another of said pixel electrode and said common electrode.

7. The in-plane switching liquid crystal display apparatus according to claim 3, wherein said specific portions are provided to a distal portion of an electrode selected from said pixel electrode and said common electrode, and to a basal portion of another of said pixel electrode and said common electrode.

8. The in-plane switching liquid crystal display apparatus according to claim 2, wherein said specific portions comprises at least two locations at a distal portion and a basal portion of said pixel electrode and said common electrode.

9. The in-plane switching liquid crystal display apparatus according to claim 3, wherein said specific portions comprises at least two locations at a distal portion and a basal portion of said pixel electrode and said common electrode.

10. The in-plane switching liquid crystal display apparatus according to claim 8, wherein a directions of said incline of said pixel electrode and a direction of said common electrode in said specific portions are mutually opposite in said specific portions provided at two locations.

11. The in-plane switching liquid crystal display apparatus according to claim 9, wherein a directions of said incline of said pixel electrode and a direction of said common electrode in said specific portions are mutually opposite in said specific portions provided at two locations.

12. The in-plane switching liquid crystal display apparatus according to claim 2,
wherein said specific portions is disposed in a medial portion of said pixel electrode and said common electrodes, and
wherein the medial portion of said pixel electrode and said common electrode has a chevron shape.

13. The in-plane switching liquid crystal display apparatus according to claim 3, wherein
said specific portions is disposed in a medial portion of said pixel electrode and said common electrodes, and
wherein the medial portion of said pixel electrode and said common electrode has a chevron shape.

14. The in-plane switching liquid crystal display apparatus according to claim 12, wherein said specific portions comprises said medial portion as well as two locations at a distal portion and a basal portion of said pixel electrode and said common electrode.

15. The in-plane switching liquid crystal display apparatus according to claim 13, wherein said specific portions comprises said medial portion as well as two locations at a distal portion and a basal portion of said pixel electrode and said common electrode.

16. The in-plane switching liquid crystal display apparatus according to claim 2, wherein
said specific portions are disposed in a medial portion of said pixel electrode and said common electrode, and
the medial portion of either said pixel electrode or said common electrode has a chevron shape and a reverse chevron shape produced by a mirror reversal thereof, and the other said pixel electrode or said common electrode is diamond-shaped.

17. The in-plane switching liquid crystal display apparatus according to claim 3, wherein
said specific portions are disposed in a medial portion of said pixel electrode and said common electrode, and
the medial portion of either said pixel electrode or said common electrode has a chevron shape and a reverse chevron shape produced by a mirror reversal thereof, and the other said pixel electrode or said common electrode is diamond-shaped.

18. The in-plane switching liquid crystal display apparatus according to claim 1,
wherein said first substrate operates on an active matrix principle and has a plurality of scan signal lines,
wherein a plurality of picture signal lines intersect the plurality of scan signal lines in a matrix configuration,
wherein a thin film transistor is formed in the pixel regions defined by said plurality of scan signal lines,
wherein said plurality of picture signal lines and a plurality of common signal lines are parallel to said plurality of scan signal lines, and said plurality of picture signal lines impart a reference potential across a plurality of pixels,
wherein said common electrode is connected to said plurality of common signal lines, and
said pixel electrodes, said plurality of scan signal lines, and said plurality of picture signal lines are connected to said thin film transistors formed on the plurality of pixels.

19. The in-plane switching liquid crystal display apparatus according to claim 1, wherein either of said pixel electrodes or said common electrode comprises a metal film.

20. A liquid crystal display, comprising:
a substrate;
a liquid crystal layer located on the substrate; and
a pixel electrode and a common electrode that are formed on a surface of the substrate, the pixel electrode and the common electrode adapted to produce an electric field parallel to the substrate,
wherein the pixel electrode and the common electrode are arranged to have parallel uniform extensions with a principal portion and a specific portion, and to form a pixel region between the pixel electrode and the common electrode,
wherein the principal portion has an electric field direction is orthogonal to an initial alignment direction of a plurality of liquid crystal molecules,
wherein the specific portion that is smaller in length than the principal portion has an electric field direction that is not orthogonal to the initial alignment direction of the plurality of liquid crystal molecules, and
wherein the initial alignment direction of the plurality of liquid crystal molecules is parallel to the longitudinal direction of the principal portion.

* * * * *